United States Patent [19]
Tuffias

[11] 3,891,282
[45] June 24, 1975

[54] LUBRICATED ASSEMBLIES

[75] Inventor: Robert H. Tuffias, Los Angeles, Calif.

[73] Assignee: Litton Systems, Inc., Beverly Hills, Calif.

[22] Filed: Dec. 12, 1973

[21] Appl. No.: 424,087

[52] U.S. Cl. .................... 308/9; 308/160; 308/170
[51] Int. Cl.² .......................................... F16C 7/04
[58] Field of Search ............... 308/9, 160, 170, 172

[56] References Cited
UNITED STATES PATENTS

| | | | |
|---|---|---|---|
| 3,376,083 | 4/1968 | Muijderman | 308/9 |
| 3,663,074 | 5/1972 | Fernlund et al. | 308/9 |

*Primary Examiner*—Richard A. Schacher
*Assistant Examiner*—Robert Saifer
*Attorney, Agent, or Firm*—Richard Zentner; Alan C. Rose; Harold E. Gillmann

[57] ABSTRACT

Disclosed herein are lubricated assemblies, more specifically bearings, wherein use is made of spiralling channels or equivalent arrangements which urge lubricant into the area where it is needed, such as the bearing gap. The invention proposes the use of such properly oriented spiralling grooves in conjunction with a displaceable separator between the two movable elements of the assembly, thereby to arrive at a lubricated assembly, such as a bearing, which is operable in either one of two opposite senses of motion, which may be the two senses of rotation of a bearing.

25 Claims, 6 Drawing Figures

PATENTED JUN 24 1975        3,891,282

SHEET    1

LUBRICATED ASSEMBLIES

FIELD OF THE INVENTION

This invention relates to lubricated assemblies and, more particularly, to lubricated bearings of the type frequently referred to as spin bearings, wherein the rotational motion at relatively high angular velocities of the rotor of the bearing is used to urge a lubricant into the bearing gap between the rotor and the stator of the bearing.

BACKGROUND OF THE INVENTION

Spin bearings of the type mentioned above and used under operating conditions of relatively high angular velocities have been developed in the past for many purposes. These bearings are provided with terminal elements frequently referred to as thrust pads which have spiralling channels, usually in the form of grooves, or equivalent configurations, so that the motion of the rotor, when it is spinning at high velocities, entrains the lubricant into the bearing gap, resulting in a pressure being developed therein. For completeness, it could be mentioned that such spiralling grooves on thrust pads may be combined with spiralling grooves on the bearing surface of the rotor or of the stator, thus constituting a system of channels through which the lubricant will be urged into the bearing. This effect is well known and explained as the result of internal friction within the lubricant and assisted by the viscosity of the lubricant. A good example of a spin bearing using thrust pads with spiralling grooves can be found in U.S. Pat. No. 3,282,633, assigned to the same assignee as the present invention.

Spin bearings of the type described above, when constructed in accordance with known principles, have an inherent disadvantage, inasmuch as satisfactory lubrication is achieved only when the rotor spins in one predetermined sense. Were it to rotate in the opposite sense, no lubricant would be urged into the bearing gap which would finally lead to destruction of the bearing, for lack of lubrication. In the terms, the sense of rotation of these known bearings is not reversible. This becomes clarified by emphasizing that the sense in which the spirals of the channels, which are more or less wide grooves, on a thrust pad are oriented constitutes a structural parameter which is built into the bearing from the beginning, and thus cannot be changed by an operator. It will be realized that, in many fields of use of for such bearings, the lack of reversibility constitutes a drawback, even though it may be true that, in some specific instances, it does not constitute a disadvantage. In order to mention a few examples, it is highly desirable to make available spin bearings of the type described which could be used in fields of application where the reversibility of rotation constitutes a necessary requirement. Thus, it is clear that, if such bearings could be constructed for use with rotation in both senses, they could become useful, for example, in connection with electrical motors, machine tools and, of course, in a great number of other fields of technology. Consequently, the main object of the present invention is the provision of reversible bearings of the type wherein lubricant channels are used for urging lubricant into the bearing gap.

SUMMARY OF THE INVENTION

In accordance with one of the more important features of the present invention, a reversible bearing or other lubricated assembly is provided by the use of a displaceable element which is mounted within the gap between the elements of such assembly, such as the stator and the rotor of a bearing. Specifically referring to bearings, such element separates a space adjacent the rotor from a space adjacent the stator. Thus, the separating element is actually provided within the bearing gap and displaceable, preferably entirely free-floating, between stator and rotor. In addition, a lubricated assembly or, more specifically, a bearing constructed in accordance with the invention also makes use of spiralling channels, or an equivalent arrangement, for controlling the pressure of lubricant, such that a pressure drop across the separating element will be developed during operation. Then, these pressure control means are provided on surfaces in such areas that the orientation of the pressure drop will depend upon the sense of rotation. This means that, with rotation in one sense, the magnitude of pressure in the space adjacent the rotor will exceed the magnitude of pressure in the space adjacent the stator. Pressure conditions will be reversed with the opposite sense of rotation. As a result, the separating element will be displaced respectively toward the stator or toward the rotor, depending upon the orientation of the pressure drop. Once the bearing rotates at the normal high angular velocity, it can be assumed that the separating element is in contact with, or at least very close to, either the stator or the rotor. In any event, by the provision of the separating element in combination with a properly selected arrangement of lubricant channels, generally referred to herein as pressure control means, lubricant will be urged into the bearing cap regardless of the sense of rotation.

In the detailed description to follow further below, the principles of the invention are explained in connection with bearings, but it will be realized that these principles are generally applicable to lubricated assemblies which need not, of necessity, be classified with bearings. Thus, such lubricated assembly, wherein the principles of the invention will be useful, can be pivoting assemblies where no complete rotation occurs. Such lubricated assembly may be generally designated as one wherein a first element is mounted for relative rotational motion with respect to another element, and the gap formed between these elements accommodates the lubricant.

Moreover, it is noted that, as used herein, the terms "stator" and "rotor" are interchangeable. It will be realized that, in most any design of a bearing, it is possible to use a bearing such that what, in one application, is the rotor is the stator in another instance, and vice versa. Thus, for purposes of simplifying the presentation of the invention, these terms are used herein in the conventional sense, but their interchangeability should be borne in mind.

BRIEF DESCRIPTION OF THE DRAWINGS

The invention will become better understood from the following detailed description of various embodiments thereof, when taken in conjunction with the drawings, wherein.

As will be seen from the description of the embodiments illustrated herein, these embodiments pertain to the class of self-contained bearings, wherein the necessary quantity of lubricant is sealed into the bearing, but it will be recognized that the principles of the invention are likewise applicable to bearings whose bearing gaps are connected to external sources of lubricant.

DETAILED DESCRIPTION

Figure 1:
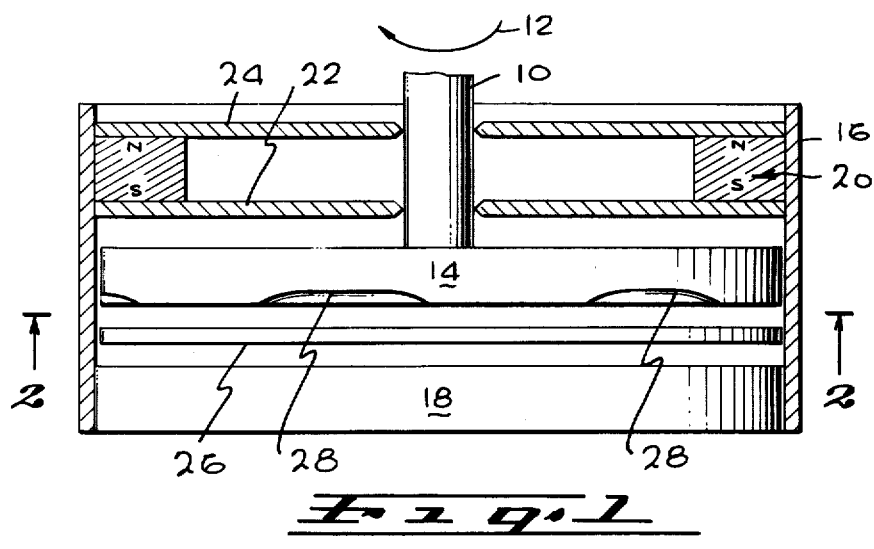
FIG. 1 is a schematic illustration, partly in an axial sectional view, of one embodiment of a lubricated bearing constructed in accordance with the invention.

With reference to FIG. 1, illustrating merely schematically an embodiment of a bearing constructed in accordance with the invention, under omission of all unnecessary details, there is shown a shaft 10 which, as a result of this invention, may be operated to rotate either in the direction indicated by arrow 12 or in the opposite direction. The shaft 10 is connected to the rotor 14, shown as a circular disc, which is accommodated in a housing, illustrated in FIG. 1 as being composed of a cylindrical housing portion 16 and a bottom portion, shown as a circular plate, which also constitutes the stator 18 of the bearing. It can be seen that the combination of housing portion 16 and stator 18 can take any desired shape. It could be a single, integral structure and, in practice, it will, of course, be a more intricate assembly. Moreover, it is noted that, in the illustration of FIG. 1, the shaft 10 extends vertically, so that the bearing of this embodiment, as shown, can be interpreted to be one which takes up axial loads in the vertical downward direction. As a matter of course, an identically, or similarly, constructed bearing could be provided at the other end of shaft 10. Then, the shaft 10 may extend horizontally and has the other, identical bearing at its other end which is not shown in FIG. 1. The combination of two such bearings together would constitute a thrust bearing capable of taking up loads in either one of the two oppositely oriented axial, then horizontal, directions. It may be combined, or used in combination, with one or more journal bearings supporting the shaft 10 at one or more intermediate locations between the two end bearings. Even though no such combined assembly is illustrated, it will be recognized by the expert in the art to which this invention pertains that various types of combinations of bearings can be used wherever desired.

Returning to the embodiment of FIG. 1, the housing formed by the stator 18 and the cylindrical housing portion 16 contains a lubricant (not indicated in the drawings) within all open spaces, including a reservoir above the rotor 14, and is sealed by a magnetic seal because, in the embodiment selected for illustration, it is assumed that the lubricant is a magnetizable fluid. It should be noted that the seal fluid may be magnetic and the bearing fluid nonmagnetic (i.e. liquid or gas), or the seal may be of the surface tension type, for example. Such magnetizable fluids are well known in the art and have been used for purposes of providing sealed assemblies as, for example, illustrated and described in the articles "Magnetic Fluid Seals," by R. E. Rosenweig, G. Miskolczy and F. D. Ezekiel, *Machine Design*, Mar. 28, 1968, pages 145–150, and "Progress in Ferrohydrodynamics," by Dr. Ronald E. Rosenweig, *Industrial Research*, October, 1970, as well as in U.S. pat. Nos. 3,726,574 and 3,746,407, issued Apr. 10, 1973, and July 17, 1973, respectively, assigned to the same assignee. Thus, the schematically shown magnetic seal of the bearing of FIG. 1 includes an annular permanent magnet 20 secured to the cylindrical housing portion 16 with the upper and lower surfaces constituting the north and south poles, or vice versa. In addition, there are provided two annular discs of magnetic material constituting pole shoes 22 and 24 and positioned at one and the other side of the permanent magnet 20. These discs are also secured to the internal surface of the cylindrical housing portion 16 and extend toward the shaft 10, with the lower pole shoe 22 defining the upper limit of the reservoir. The internal edges, which are those which are in proximity of the shaft 10, have relatively sharp edges and thus it can easily be seen that they set up a magnetic field which passes through the shaft and whose strength is increased, as the flux lines converge, between the sharp internal edges of the pole shoes and the surface of the shaft 10, which must be magnetic when a magnetic seal is used. The known assembly thus described and shown in FIG. 1 constitutes a conventional magnetic seal, as the concentrated magnetic flux between the internal sharp edges of the annular pole shoes 22 and 24 and the shaft 10 prevents leakage of the magnetizable fluid out of the bearing, without preventing rotation of the shaft 10.

Within the bearing gap, which is the space between rotor 14 and stator 18, there is mounted the separating element, briefly referred to as a separator, in the form of a flat plate, or disc, 26, which is also of circular shape. In FIG. 1, the separator 26 is schematically illustrated at a position such that a space is formed between the rotor 14 and the separator 26, and another space is formed between the separator 26 and the stator 18. Even though, in practice, these spaces and the entire bearing gap are very narrow, the separator 26 is displaceable toward the rotor 14 or toward the stator 18, but only over short distances. Still, there are two separate spaces formed. The separator 26 is suitably entirely free-floating, though, in some modifications, it may be found advisable to provide some guide elements for a separator. In a bearing constructed in accordance with FIG. 1, the cylindrical housing portion 16 will provide such guide element, so that the separator 26 is entirely free-floating within the gap.

In addition to the separator, in order to provide a useful bearing, at least one surface, such as a surface of the stator, of the rotor or of the separator, must be provided with spiralling lubricant channels, or any equivalent thereof, which would have the effect of pressure control means such that a pressure drop across the separator 26 will be developed whenever the shaft 10 is driven into rotation. Such pressure control means, in the form of spiralling channels, are most suitably provided at least at the surface of the rotor 14 which is the lower surface of the rotor in the illustration of FIG. 1, because this is the bearing surface facing the stator 18. Alternatively, the pressure control means, i.e. grooves, could be provided on the bottom surface of the rotor 14 and the top surface of the stator 18, with the separator 26 being a flat disc, as described further below.

Figure 2:
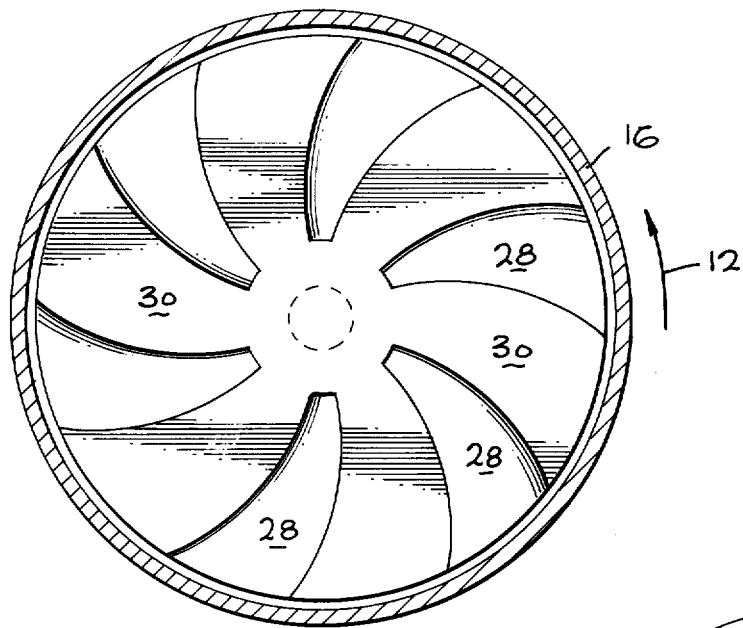
FIG. 2 is a cross-sectional view taken along line 2—2 of FIG. 1.

An illustration of suitable spiralling grooves in the bearing surface of the rotor 14 is given in FIG. 2 which is a cross-sectional view taken along line 2—2 of FIG. 1. From FIG. 2, it can be seen that spiralling grooves 28 are provided between raised areas 30, frequently referred to as lands, inasmuch as thrust pads having this configuration are known in the art.

Assuming now that the shaft 10, and therewith the rotor 14, is driven into rotation in the sense indicated by arrow 12 in FIGS. 1 and 2, then, the channels 28 of the bearing surface of the rotor 14 will operate such that lubricant is urged radially outwardly from the space between rotor 14 and separator 26, with the result that the magnitude of lubricant pressure in that space decreases, so that the separator 26 is displaced toward the rotor 14, i.e. upwardly in FIG. 1. As a consequence of this pressure drop across the separator 26, lubricant is urged into the space between separator 26 and stator 18. Once the bearing operates at full speed, usually a very high angular velocity, the separator 26 will have been displaced very close to the rotor 14 and may be assumed to be entrained into its motion. It is believed that a very thin lubricant film will always remain and fill the correspondingly thin space between the rotor 14 and the separator 26. If the shaft 10 rotates in the sense opposite to that shown by arrow 12, operating conditions can be seen to be reversed.

Even though the bearing thus described is believed to be operable with a single system of spiralling lubricant channels 28 on the bearing surface of the rotor 14, it was found highly desirable that a second set of such grooves be provided on at least one of the surfaces defining the space between separator 26 and stator 18. Such set of spiralling grooves may suitably be provided on the bearing surface of the stator 18 which is, of course, its internal, upwardly oriented surface in the showing of FIG. 1. In order that the spiralling grooves of such second set properly assist in the operation of the bearing, its spirals must be oriented such that they have the same orientation in space, i.e. with respect to a fixed system of reference planes. In other words, the sense of orientation of the grooves 28 in FIG. 2, which are the grooves on the bearing surface of the rotor 14, and the sense of orientation of the grooves on the bearing, i.e. the upper surface of the stator 18, must have a relationship which is that of an image and its mirror image. In order to still better explain this relationship, if FIG. 2 were temporarily assumed to be a view of the grooves of the second set, i.e. the grooves in the stator 18, the orientation of the spirals of grooves 28 and the lands 30 would be reversed.

Alternatively, the set of spiralling grooves in the space between separator 26 and stator 18 may be provided upon that surface of the separator 26 which faces the stator 18, i.e. the lower surface in the illustration of FIG. 1. Then, the grooves would have to be oriented oppositely in space or, again, in different terms, FIG. 2 can then be interpreted to be a correct showing of the grooves on the lower surface in FIG. 1 of the separator 26.

It will be seen that such second set of spiralling grooves will assist in the operation of the bearing. Again assuming a sense of rotation of shaft 10 indicated by arrow 12 in FIG. 1, the rotor 14, with its set of spiralling grooves as shown in FIG. 2, will urge lubricant radially outwardly, the separator 26 will be displaced upwardly, as explained above, and then the second set of grooves, no matter if it is provided on the stator 18 or on the separator 26, will operate to urge lubricant into the space between stator 18 and separator 26. Conversely, if the shaft 10 were rotating in the opposite direction, conditions would be reversed. Then, the grooves upon the rotor 14 will urge lubricant into the space between the rotor 14 and the separator 26, the separator 26, as a result of the pressure drop across it, will be urged downwardly in FIG. 1, i.e. toward the stator 18, and, again, the second set of grooves will assist in this operation.

Thus, it can be seen that the separator will be displaced either toward the stator or toward the rotor, as a function of the sense of rotation of shaft 10 and rotor 14, and the two sets of spiralling grooves will cooperate such that lubricant is urged into one or the other of the spaces of the bearing gap, at one or the other side of the separator, and the desired effect is achieved, namely the bearing will be operative and maintained lubricated regardless of the sense of rotation.

From the description of the embodiment of FIGS. 1 and 2 thus far progressed, it will be realized that the example selected for illustration constitutes a self-contained hydrodynamic fluid film bearing. It will also have become clear that the separator 26 which divides the bearing gap into two spaces, in cooperation with properly oriented lubricant channels, which may be wide channels as shown in FIG. 2 or narrow grooves in greater number, operates such that the magnitude of lubricant pressure in one or the other of these two spaces will be increased, while the magnitude of pressure in the other space will be decreased and then lubricant will be urged into that of the spaces in which the magnitude of pressure has been decreased until a dynamic equilibrium will be reached, which may depend upon the speed of rotation.

For completeness, it could be mentioned that lubricated assemblies or bearings of the invention are often manufactured from metallic material, with the advantage that conventional masking and etching technologies may be used in producing the lubricant channels, even though any other suitable material may be used. As to equivalents for spiralling channels, the pressure control means may take the form of intake ports illustrated and described in the publication "Fluid Film Bearings — A Survey of their Design, Construction and Use," by P. J. Geary, 1962, British Scientific Instrument Research Association Report R. 286, pages 45–47, see FIG. 15 on page 46 and the corresponding text.

As to the proper orientation of the spirals, it can be noted that the rule for orientation is simply that, if the channels are provided on oppositely oriented surfaces, they must be oriented identically with respect to a fixed system of coordinate axes, i.e. they will appear like an image and its mirror image. On the other hand, whenever the spiralling channels in the different spaces are provided on surfaces which have the same orientation, the spirals must be oriented oppositely with respect to such system of reference axes and then they are identical when represented such as has been done with the grooves 28 in FIG. 2. Even though the use of a gas as the lubricant is contemplated by the invention, the lubricant in many instances will be a viscous liquid and preferably a magnetizable viscous liquid, as such lubricant will permit the use of the magnetic seal shown in FIG. 1 and described above. In addition, a magnetizable liquid can be used in the seal and a different liquid or gas in the bearing.

Even though it has been stated above that a set of spiralling channels, also referred to herein as grooves, for the lubricant may be provided on only one surface, preferably the bearing surface of the rotor 14 of FIG. 1, better results will be achieved if at least one further set of grooves, or such spiralling channels, is provided on another surface, suitably upon the bearing surface of the stator 18, as illustrated in FIG. 2. It will, however, be recognized that the provision of one separator, which need not be a single element, provides four surfaces which are available for sets of spiralling grooves, so that it is contemplated to use three or even four such sets of spiralling grooves. Each set will assist in the proper performance of the bearing, provided that the above rules setting forth the sense in which the spirals must be oriented are observed.

Figure 3:
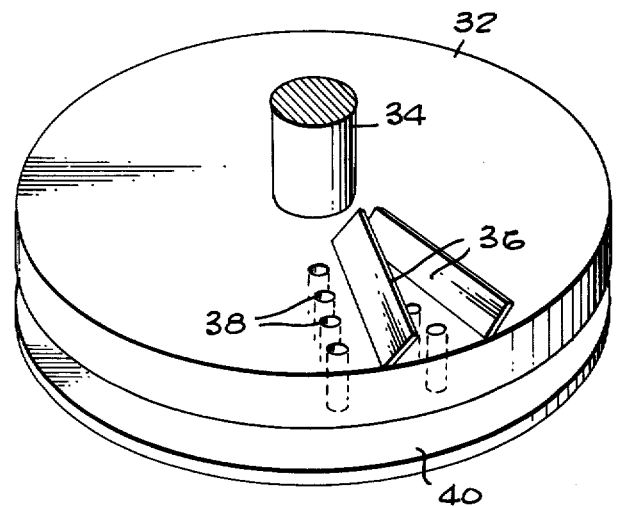
FIG. 3 is a partial perspective schematic view of the rotor and the separator of a modification of the embodiment of FIG. 1.

In FIG. 3, there is shown a modification of the rotor of a bearing which otherwise may be constructed identically with that of the embodiment of FIGS. 1 and 2. Referring to FIG. 3, the rotor 32, also in the shape of a circular disc, secured to shaft 34 is provided with pressure control means which are not spiralling grooves but consist of vanes 36, of which only two are shown in FIG. 3 but which will be provided in a sufficiently great number to be distributed equally over the entire upper surface of the rotor 32. As shown in FIG. 3, the vanes 36 are mounted to form an angle which is smaller than 90 angular degrees with respect to the surface of the rotor 32. In addition, a plurality of bores 38 through the rotor 32 is used to cooperate with the vanes 36. It can be seen that, whenever the rotor 32 is driven into rotation by means of shaft 34 in one sense, the vanes will cause lubricant to be urged through the bores 38 into the space between the rotor 32 and the separator 40, corresponding to separator 26 in FIG. 1, whereas, conversely, upon rotation in the opposite sense, corresponding to that of arrow 12 in FIG. 1, lubricant will be urged upwardly in the showing of FIG. 3 and the magnitude of pressure in the space between rotor 32 and separator 40 will be decreased. With respect to all other structural elements, a bearing implementing the modification of FIG. 3 will be identical with the bearing shown in FIGS. 1 and 2. Thus, the vanes 36, combined with the bores 38, will be recognized to be a different implementation of the pressure control means which cause the displacement of the separator 40 as a result of the change in magnitude of pressure in the form of an increase or a decrease of lubricant pressure in the space between rotor 32 and separator 40 as a function of the sense rotation.

As a further modification of the presently discussed embodiment of the invention which could be mentioned, it is possible to omit the vanes 36 and provide bores which have an orientation such that the axis through each bore is inclined with respect to the circular surfaces of the rotor 32. If this inclination of the bores is such that the axis through each bore lies in a tangential plane, the bores can easily be seen to operate to achieve the intended effect, inasmuch as they will assume the function of the vanes 36 illustrated in FIG. 3.

Figure 4:
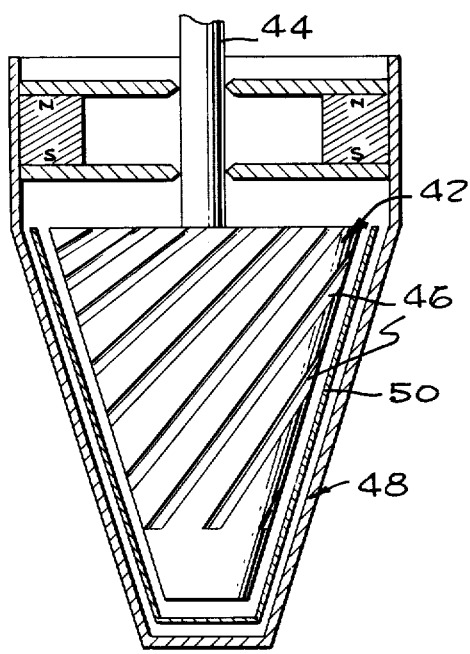
FIG. 4 is a schematic illustration, partly in an axial sectional view, of another embodiment of a lubricated bearing constructed in accordance with the invention.
Figure 5:
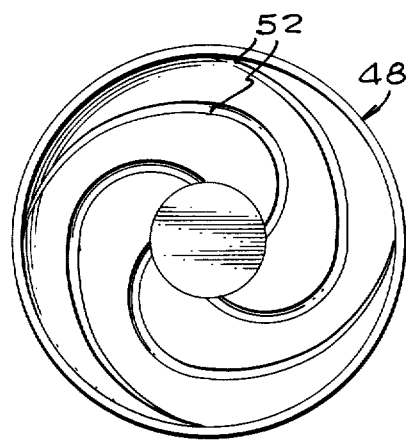
FIG. 5 is a top view of the stator of the bearing of FIG. 4.
Figure 6:
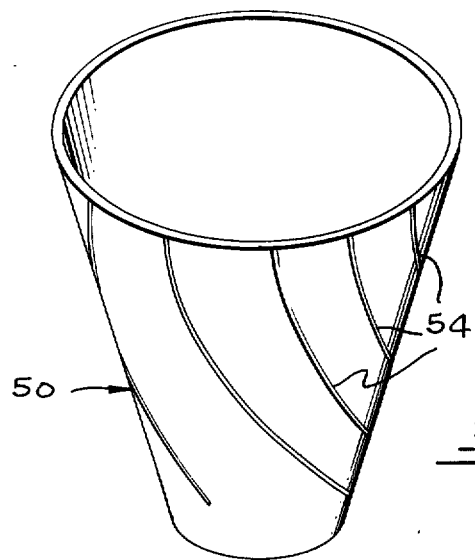
FIG. 6 is a perspective view of a modification of the separating element of the bearing of FIGS. 4 and 5.

A different embodiment of a self-contained bearing is illustrated in FIGS. 4, 5 and 6, the only difference being that, instead of flat circular discs, the rotor, the stator and the separator of the embodiment of these figures have the shape of truncated cones. Spherical surfaces, or cylindrical surfaces, may also be used. Thus, the rotor 42 of the bearing shown in FIG. 4 secured to shaft 44 is a solid frustoconical body provided with spiralling grooves 46 on its concial surface. The stator 48 which at the same time constitutes the housing for the bearing has a corresponding shape and the same applies to the separator 50 shown in the bearing gap which is filled with lubricant, in this embodiment also assumed to be, but not necessarily, a magnetizable fluid, so that a magnetic seal can be used which precisely corresponds to the magnetic seal illustrated in FIG. 1.

If a second set of spiralling grooves is provided on the internal, conical bearing surface of the stator 48, they will appear as illustrated in FIG. 5. It should be noted that FIG. 5 illustrates the stator in a top view and, in order to show the grooves 52, the stator, the separator and the elements of the magnetic seal are omitted from FIG. 5.

Since, aside from the modified shape, the embodiment of FIGS. 4, 5 and 6, in essence, is constructed and operates as the embodiment of FIGS. 1 and 2, no repetition of the detailed description is believed necessary. In this instance, again, at least one of the four available surfaces must have pressure control means for producing the pressure drop across the separator 50, as described above in connection with the embodiments of FIGS. 1 and 2. Thus, in one modification, the combination of FIGS. 4 and 5 illustrates the modifications where two sets of spiralling grooves are used, namely the set of grooves 46 on the rotor 42 and the set of grooves 52 on the stator 48, as shown in FIG. 5. The additional set of grooves which may be on the external surface of the separator 50, may have the configuration illustrated in FIG. 5. Merely to show that the grooves may be narrow channels, instead of the wide grooves 52 shown in FIG. 5 or the wide grooves 28 in FIG. 2, the grooves 54 on the external surface of the separator 50 are illustrated in FIG. 6 as very narrow channels which are suitably used in a very great number to produce the desired effect. These grooves 54 may be used in substitution of the grooves 52 on the stator, even though, preferably, both sets of grooves 52 and 54 can be used in addition to the grooves 46 on the rotor 42. As has been explained above, even a fourth set of grooves which would be on the internal surface of the separator 50 could be provided. Again, the same rule of the sense of orientation of the spirals is applicable and, therefore, need not be repeated.

Summarizing, it will be seen that the combination of the separator, which is suitably free-floating and must be displaceably mounted within the bearing gap, with the properly oriented pressure control means, such as channels, for the lubricant results in the desired effect. Specifically, increasing the magnitude of lubricant pressure in one of the available spaces in the bearing gap above the magnitude of lubricant pressure in the other space permits the bearing to be operated as a reversible bearing which thus will be properly lubricated when spinning in either one of the two senses of rotation, with all attendant advantages of this type of bearing being preserved.

It will be obvious that many further modifications can be made to the lubricated assemblies or bearings of this invention, such as the application of the fundamental principles to spherical bearings or lubricated assemblies of other shapes, without departing from the scope of the invention as defined in the appended claims.

What is claimed is:

1. An assembly, comprising:
   first and second elements mounted for relative rotational motion one with respect to the other selectively in one sense and the opposite sense, the elements forming a gap therebetween;
   means displaceably positioned within the gap for separating, one from the other, a first space adjacent the first element and a second space adjacent the other element;
   means for maintaining lubricant in the gap; and
   pressure control means for producing across the separating means a pressure drop whose orientation depends upon the sense of rotational motion, to thereby cause displacement of the separating means selectively toward the first element and toward the second element as a function of the sense of rotational motion.

2. The assembly of claim 1, wherein the pressure control means are operable to increase the magnitude of lubricant pressure in the first space above the magnitude of lubricant pressure in the second space upon relative rotational motion in one sense and to increase the magnitude of lubricant pressure in the second space above the magnitude of lubricant pressure in the first space upon relative rotational motion in the opposite sense.

3. The assembly of claim 2, wherein the first and second elements are respectively the rotor and stator of a self-contained hydrodynamic fluid film bearing, the gap therebetween is the bearing gap and sealing means are provided for preventing lubricant from leaking out of the bearing.

4. The assembly of claim 2, wherein the lubricant is a gas.

5. The assembly of claim 2, wherein the lubricant is a viscous liquid.

6. The assembly of claim 5, wherein the lubricant is a magnetizable fluid and the seal is a magnetic seal.

7. The assembly of claim 2, wherein the pressure control means comprise at least one first set of spiralling channels on a surface defining the first space and at least one second set of spiralling channels on a surface defining the second space.

8. The assembly of claim 7, wherein the spiralling channels of the first and of the second sets are on oppositely oriented surfaces of the first and second element, respectively, and the spirals of the first set are identically oriented in space with the spirals of the other set.

9. The assembly of claim 7, wherein the spiralling channels of the first and of the second sets are on identically oriented surfaces of one element and on the separating means, respectively, and the spirals of the first set are oriented in space in the sense which is opposite of that of the spirals of the other set.

10. The assembly of claim 2, wherein the pressure control means comprise a sealed housing for preventing escape of lubricant.

11. A self-lubricated bearing, comprising, within a sealed housing:
    a rotor and a stator having bearing surfaces which form a bearing gap therebetween;
    a lubricant at least within the bearing gap;
    a separator displaceably arranged within the lubricant in the bearing gap and between the bearing surfaces; and
    pressure control means for developing a pressure drop across the separator regardless of the sense of rotational motion of the rotor with respect to the stator.

12. The bearing of claim 11, wherein the pressure control means comprise spiralling channels including:
    a first set of spiralling channels upon the bearing surface of the rotor for increasing lubricant pressure within a space between the said bearing surface of the rotor and the separator, to thereby cause displacement of the separator toward the stator; and
    a second set of spiralling channels on a surface defining the space between the separator and the stator for increasing lubricant pressure within the space between the separator and the said bearing surface of the stator, to thereby cause displacement of the separator toward the rotor.

13. The bearing of claim 12, wherein the lubricant is a gas.

14. The bearing of claim 12, wherein the lubricant is a viscous liquid.

15. The bearing of claim 14, wherein the lubricant is a magnetizable fluid and the housing has at least one magnetic seal.

16. The bearing of claim 12, wherein the spiralling channels of the second set are on the bearing surface of the stator facing the separator and identically oriented in space with the spirals of the first set.

17. The bearing of claim 12, wherein the spiralling channels of the second set are on the surface of the separator facing the stator and oriented in the sense which is opposite with respect to that of the spirals of the first set.

18. The bearing of claim 11, wherein each, the rotor and the stator, is a substantially flat, circular disc and the separator is a free-floating further flat circular disc, all three flat discs being mounted in a cylindrical sealed housing.

19. The bearing of claim 12, wherein the spiralling channels are on the bearing surface of the stator.

20. The bearing of claim 12, wherein the spiralling channels are on the surface of the separator facing the stator.

21. The bearing of claim 18, wherein the lubricant is a magnetizable fluid, and the housing has at least one magnetic seal.

22. The bearing of claim 12, wherein the rotor and the stator have mutually corresponding frustoconical bearing surfaces facing one another and the separator is a hollow conical frustum mounted free-floating between the bearing surfaces.

23. The bearing of claim 22, wherein the spiralling channels are on the conical bearing surface of the stator.

24. The bearing of claim 22, wherein the spiralling channels are on the conical, external surface of the separator facing the stator.

25. The bearing of claim 22, wherein the lubricant is a magnetizable fluid, and the housing has at least one magnetic seal.

* * * * *